(12) United States Patent
Whiteside

(10) Patent No.: US 6,705,622 B2
(45) Date of Patent: *Mar. 16, 2004

(54) MECHANIC'S CREEPER

(75) Inventor: Kirt E. Whiteside, Marion, OH (US)

(73) Assignee: Whiteside Mfg. Co., Delaware, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 128 days.

(21) Appl. No.: 09/523,469

(22) Filed: Mar. 10, 2000

(65) Prior Publication Data

US 2002/0060437 A1 May 23, 2002

(51) Int. Cl.[7] ................................................ B25H 5/00
(52) U.S. Cl. ........................................ 280/32.6; 16/20
(58) Field of Search ................................ 280/32.6, 32.5, 280/87.041; 16/20, 21

(56) References Cited

U.S. PATENT DOCUMENTS

| 1,769,548 | A | * | 7/1930 | Rodin | 280/32.6 |
|---|---|---|---|---|---|
| 1,882,497 | A | * | 10/1932 | Jarvis | 16/20 |
| 2,487,706 | A | * | 11/1949 | Happ | 280/32.6 |
| 2,683,734 | A | * | 7/1954 | Wilson | 280/32.6 |
| 4,707,880 | A | * | 11/1987 | Doyle et al. | 16/20 |
| 5,174,592 | A | * | 12/1992 | Pool | 280/32.6 |
| 5,199,131 | A | * | 4/1993 | Harris | 16/20 |
| 5,263,226 | A | * | 11/1993 | Roy et al. | 16/20 |
| 5,287,594 | A | * | 2/1994 | Hicks | 16/20 |
| 5,472,219 | A | * | 12/1995 | Eckstrum | 280/32.6 |
| 5,527,051 | A | * | 6/1996 | Plaza | 280/32.6 |
| 5,745,951 | A | * | 5/1998 | Waner | 16/20 |
| 5,813,090 | A | * | 9/1998 | Miles | 16/20 |
| D406,433 | S | * | 3/1999 | Taylor et al. | 280/32.6 |
| 5,895,062 | A | * | 4/1999 | Miles et al. | 280/32.6 |
| 6,076,838 | A | * | 6/2000 | Peterson et al. | 280/32.6 |

* cited by examiner

*Primary Examiner*—Brian L. Johnson
*Assistant Examiner*—Jeffrey J. Restifo
(74) *Attorney, Agent, or Firm*—Renner, Kenner, Greive, Bobak, Taylor & Weber

(57) ABSTRACT

A mechanic's creeper (10) includes a pad (12) supported between a plurality of side rails (14) by a plurality of crossbars (15). The side rails (14) are of tear-shaped cross section such that no sharp edges are provided adjacent to the pad (12) held between the side rails (14). The pad (12), side rails (14), and crossbars (15) are held off the ground by a plurality of caster assemblies (20). The caster assemblies (20) are connected only to the bottom surface (16) of the side rails (14) such that no protrusion is created on the top surface (17) of the side rails (14). Specifically, each of the caster assemblies (20) is connected to an associated side rail (14) by a rivet nut (54) that communicates only with the bottom surface (16) of side rail (14). The caster assemblies (20) further include rolling elements (24, 26) and bearing races (32, 34) that allow the caster assemblies (20) to rotate about the axis of a kingpin (42). The kingpin (42) retains the various elements of the caster assemblies (20) in an operative relation. Additionally, the lateral extent of side rails (14) is such that the top race (32) lies wholly within the vertical profile of its associated side rail (14).

23 Claims, 2 Drawing Sheets

MECHANIC'S CREEPER

TECHNICAL FIELD

The present invention relates to mechanic's creepers and, more particularly, to a mechanic's creeper having an improved side rail and caster assembly providing a more contoured fit for the user, improved resistance to wear and tear, and a lack of protrusions on the side rails so as to avoid the snagging and tearing of clothes and possible scratches to the user's body.

BACKGROUND ART

Mechanic's creepers are in wide-spread use, however, it has been found that the common, prior art mechanic's creeper design can be improved in a number of ways. Currently, mechanic's creepers are designed with side rails usually of rectangular or square cross section. The side rails thus provide sharp edges that lie adjacent to the padding held between the side rails. Because the padding sections provided between the side rails are not normally as wide as the breadth of the shoulders of the typical user, the sharp edges can often present a discomfort to the user.

Also, the casters on the typical mechanic's creeper are attached to the side rails in such a way as to provide protrusions on the top surface of the side rails. These protrusions can be an additional source of discomfort to the user because they are likely to snag and tear the user's clothing and scratch the user's body. More specifically, in mechanic's creepers of the prior art, the casters are attached to the side rails by means of a caster-carrying stud that is inserted through both the top and bottom walls of the side rail and secured by a nut threaded thereon. The remainder of the caster assembly is thereby positioned below the side rail and a bolt-head protrusion is undesirably located on the top surface of the side rail.

The width of the side rails in mechanic's creepers of the prior art relative to the diameter of the caster raceways needed to support the creeper also presents problems. Prior art mechanic's creeper designs incorporate caster assemblies having bearing races that are of larger diameter than the width of the side rails such that a portion of the bearing race extends beyond the sides of the side rails. As such, the portion of the bearing race which extends beyond the side rails is susceptible to being bumped or otherwise contacted which could readily loosen or otherwise damage the caster assembly. Moreover, since the bearing race does not fully engage the side rail all the way around the race, the rocking forces born by the caster assemblies as the mechanic's creeper is utilized creates weaknesses in the caster assemblies. For instance, the nuts securing the bolts through the side rails tend to loosen due to the torque placed upon the stem of the bolt as the creeper is moved and the caster assemblies roll and change directions. Moreover, adverse forces on the caster stems may well cause a shearing of these stems. In addition, because the bearing races do not completely engage the side rails, the weight placed upon the mechanic's creeper (i.e., the weight of the user's body) is not evenly distributed to the bearing race and the bearings therein. This increases the wearing of the bearings and therefore shortens the useful life of the caster assemblies and the mechanic's creeper as a whole.

Thus, there exists a need in the art for a mechanic's creeper design that provides a more comfortable, contoured fit for the user when lying down on the pads held between the side rails. Additionally, there exists a need in the art for a mechanic's creeper in which the caster assemblies are attached to the side rails without creating any protrusions on the top surface of the side rails and which also attach in a manner that prevents wear and tear to the bearings and the bearing races such as encountered with current mechanic's creeper designs.

DISCLOSURE OF THE INVENTION

It is thus an object of the present invention to provide a mechanic's creeper with a caster assembly having bearing races that are fully positioned under and within the profile of the side rails.

It is another object of the present invention to provide a mechanic's creeper, as above, wherein the caster assemblies are attached to the side rails without creating any protrusions on the top surface of the side rails.

It is a further object of the present invention to provide a mechanic's creeper, as above, wherein the side rails are of tapered and contoured cross section such that the side rails do not provide sharp edges adjacent to the padding of the mechanic's creeper.

It is an additional object of the present invention to provide a mechanic's creeper, as above, wherein the caster assemblies do not include caster stems.

These and other objects of the present invention as well as the advantages thereof over existing prior art forms, which will become apparent from the description to follow are accomplished by the improvements hereinafter described and claimed.

In general, a creeper made in accordance with the present invention includes a pad supported between opposed side rails. A plurality of caster assemblies attach to and support the side rails.

In accordance with one aspect of the present invention, the top surface of the side rails tapers toward the bottom surface of the side rails to define a decreased cross section of the rails, that decreased cross section being positioned adjacent to the pad.

In accordance with another aspect of the present invention, the caster assemblies include top and bottom bearing brackets providing, respectively, top and bottom races, and the caster assemblies are attached to the side rails such that the top race of the top bearing bracket lies wholly within the vertical profile of the side rail.

In accordance with yet another aspect of the present invention, the caster assemblies are attached to the side rails so as not to create a protrusion on the top surface of the side rails.

A preferred exemplary mechanic's creeper incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
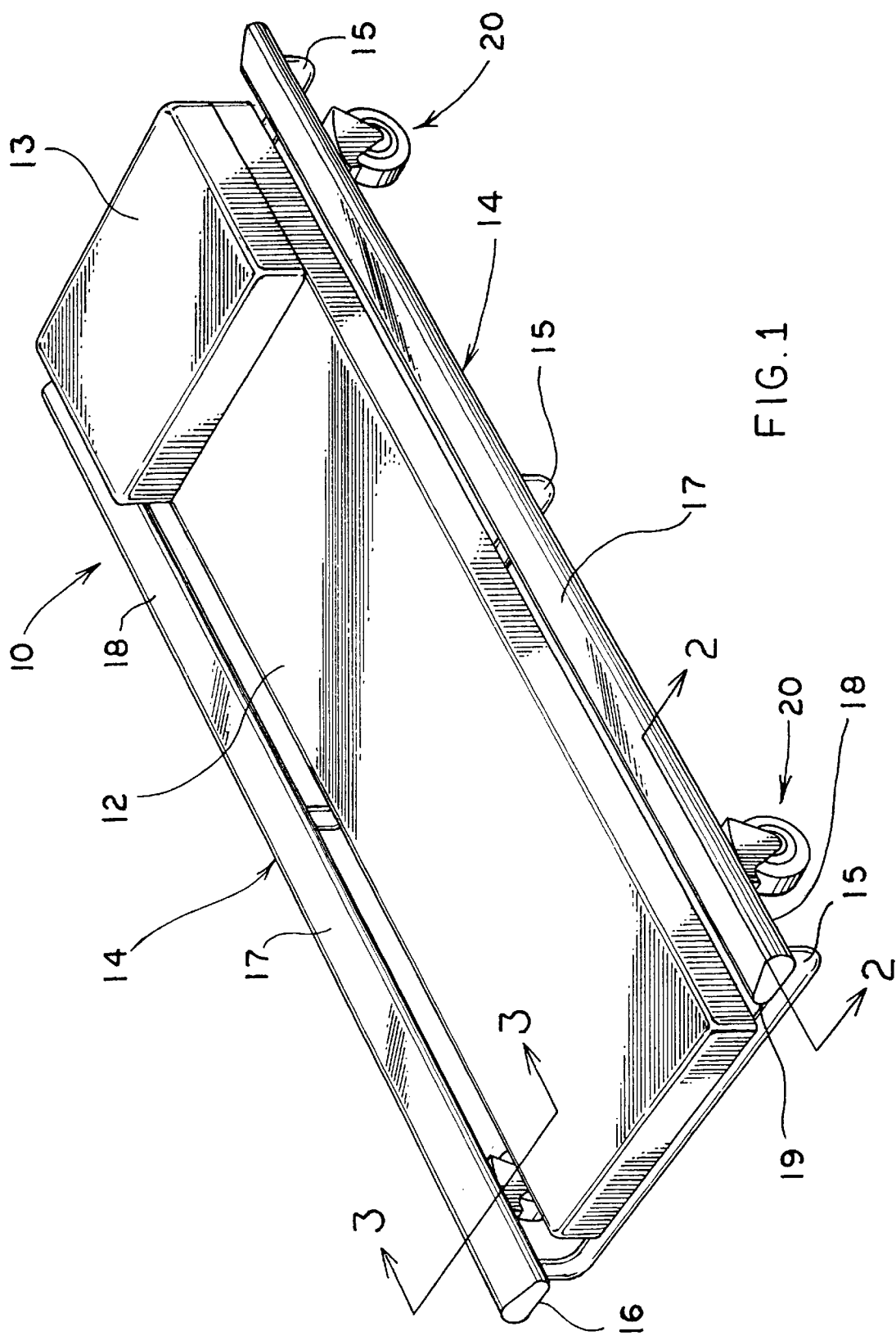
FIG. 1 is a perspective view of the mechanic's creeper made in accordance with the concepts of the present invention.
Figure 3:
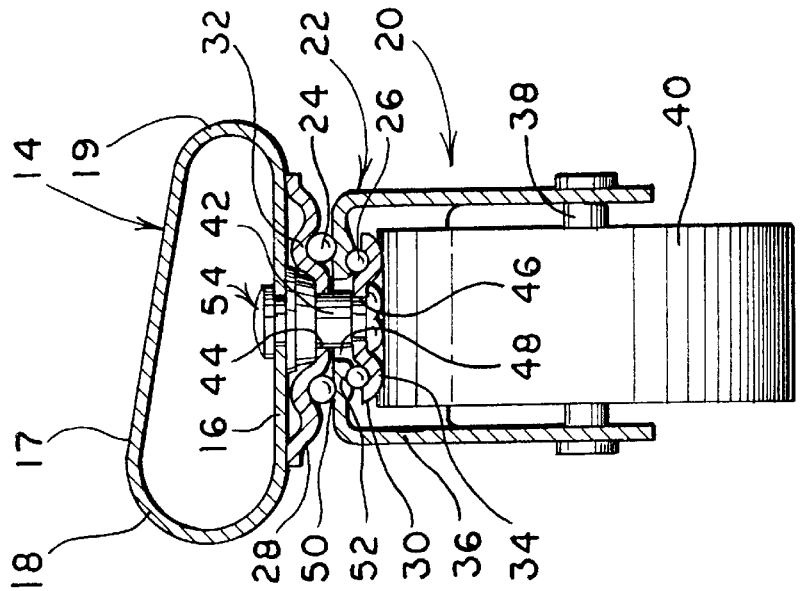
FIG. 3 is a sectional view taken substantially along line 3—3 of FIG. 1.

A mechanic's creeper made in accordance with the concepts of the present invention is generally indicated by the numeral 10 and includes padding 12 and, optionally, a headrest 13 held between opposed side rails, generally indicated by the numeral 14, on a plurality of crossbars 15. As hereinabove discussed, side rails of the prior art are normally of square or rectangular cross section and therefore provide sharp edges adjacent to the padding held between the side rails. However, as seen in FIGS. 1 and 3, side rails 14 of the present invention are generally tear-shaped so as to eliminate the discomfort encountered when utilizing mechanic's creepers of the prior art. As such, each side rail 14 is hollow and includes a generally horizontal bottom surface 16, which thus lies substantially parallel to the surface upon which creeper 10 is placed, and an opposed top surface 17 which is angled in relation to bottom surface 16 so as to provide a generally tapered cross section. The lateral outer ends of surfaces 16 and 17 are connected by an outer arcuate surface 18 and the laterally inner ends of surfaces 16 and 17 are connected by an inner arcuate surface 19. Of course, because of the taper, just described, the radius of curvature of surface 18 is greater than that of surface 19. The lateral edges of surfaces 18 and 19 define the vertical profile of each rail 14.

Since side walls 14 taper in the direction of padding 12 such that the surface 19 of side rails 14 is positioned adjacent to padding 12, side rails 14 and padding 12 cooperate to cradle an individual using creeper 10 to minimize any discomfort. It should be readily understood that, while the preferred shape disclosed herein for side rails 14 is a tear shape, the present invention should not be limited specifically thereto or thereby. Indeed, the basic improvement achieved by side rails 14 is the provision of a tapered side rail design and elimination of sharp edges adjacent to padding 12 and, therefore, this aspect of the present invention should be understood to encompass all tapered side rail designs eliminating such sharp edges.

Padding 12, side rails 14 and crossbars 15 are held off the ground and made mobile by a plurality of caster assemblies generally indicated by the numeral 20 and attached to the bottom surface 16 of side rails 14 in a manner as will be hereinafter described. Caster assemblies 20 each include a wheel assembly 22 that rotates on a vertical axis on a set of top and bottom rolling elements 24, 26, respectively, that are retained within top and bottom bearing brackets 28, 30, respectively. More specifically, top rolling elements 24 are maintained between top race 32 of top bearing bracket 28 and a horn 36 of wheel assembly 22, while bottom rolling elements 26 are maintained between a bottom race 34 of bottom bearing bracket 30 and horn 36 of wheel assembly 22. Horn 36, via axle 38, carries a wheel 40 such that wheel 40 may revolve on axle 38 as creeper 10 is being moved. Moreover, wheel 40 may rotate to allow for movement of creeper 10 in any direction because horn 36 is held between top and bottom rolling elements 24, 26 so as to pivot around the vertical axis defined by a kingpin or rivet 42.

Figure 2:
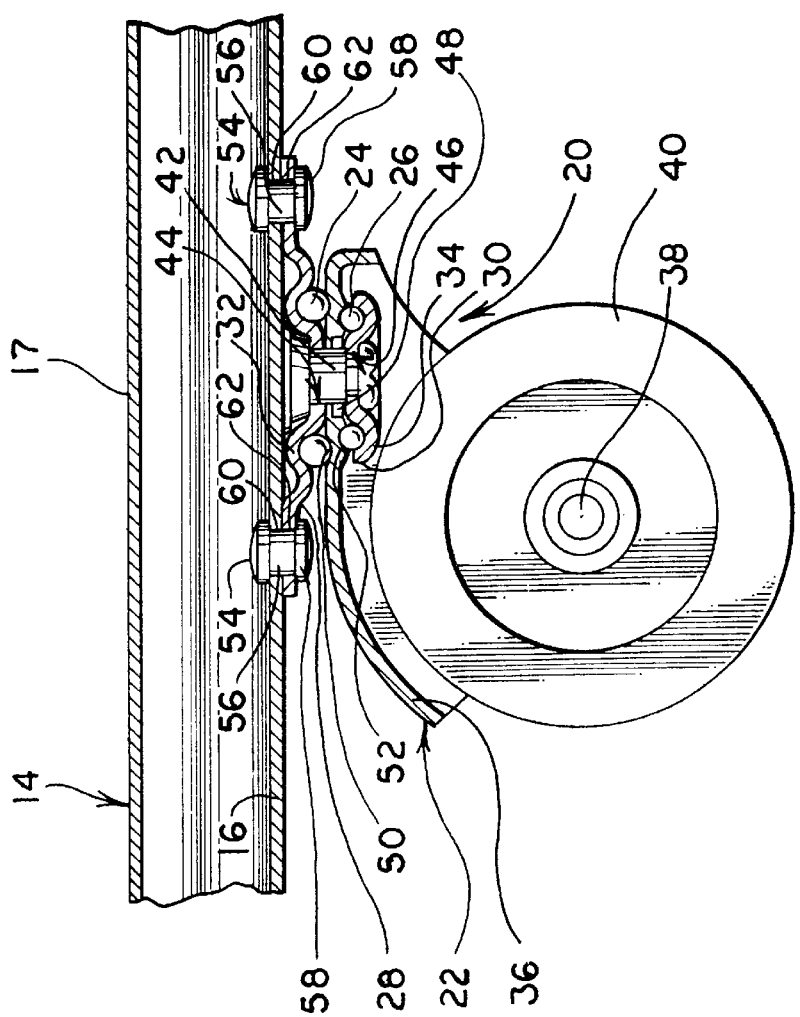
FIG. 2 is a fragmented, sectional view taken substantially along line 2—2 of FIG. 1.

Kingpin 42 extends through apertures 44, 46 and 48 in top bearing bracket 28, bottom bearing bracket 30 and horn 36, respectively, such that horn 36 is securely retained between rolling elements 24, 26 and capable of rotating thereon. It should be noted that apertures 44 and 46 in top and bottom bearing brackets 28 and 30 abut and intimately contact kingpin 42 while aperture 48 in horn 36 provides a gap between kingpin 42 and horn 36 so as to facilitate the rotation of horn 36 and associated wheel 40 around the axis of kingpin 42. To ensure that the gap provided by aperture 48 is not easily compromised by a shifting of horn 36, and also to facilitate the rotation of horn 36 around the axis of kingpin 42, horn 36 is provided with top and bottom raceways 50, 52, respectively, which receive top and bottom rolling elements 24, 26, respectively. Although top and bottom raceways 50, 52 are not as defined as top and bottom races 32, 34, they ensure that horn 36 and rolling elements 24, 26 will be biased to remain in the position as shown in FIGS. 2 and 3, wherein horn 36 rotates on rolling elements 24, 26 and is free from contact with kingpin 42.

Kingpin 42 is substantially different from kingpins (stems) utilized in mechanic's creepers of the prior art. The prior art utilizes caster stems which, in addition to providing an axis for rotation of the caster assemblies, also provide the main means for attachment of the caster assemblies to the side rails. Unlike kingpin 42 of the present invention, the stems of the prior art are basically bolts extending fully through the side rails and secured by nuts threaded thereon. Thus, kingpins of the prior art create protrusions on the top surface of the side rails. These protrusions inevitably cause discomfort to the individual using the mechanic's creeper—snagging and tearing the individual's clothing and scratching the individual's body. As is clearly shown herein, kingpin 42 does not extend to or through the top surface of side rails 14. Moreover, kingpin 42, unlike kingpins (stems) of the prior art, serves only to hold the various elements of caster assembly 20 (i.e., top and bottom bearing brackets 28, 30, and wheel assembly 22) together, and does not attach caster assembly 20 to side rails 14.

Rather, caster assemblies 20 of the present invention are attached to side rails 14 by two or more fasteners that will be referred to herein as rivet nuts generally indicated by the numeral 54. Rivet nuts 54 removably attach top bearing bracket 28 and the associated remainder of each caster assembly 20 to bottom surface 16 of each side rail 14. Rivet nuts 54 include rivets 56 that have a threaded bore into which bolts 58 fasten to secure top bearing bracket 28 to the bottom surface 16 of side rail 14. Rivet 56 of rivet nut 54 is substantially, permanently attached to bottom surface 16 of side rail 14, through apertures 60 in bottom surface 16, and provides a threaded bore for bolt 58 of rivet nut 54. Top bearing bracket 28 includes apertures 62 that align with rivets 56 which are secured to side rail 14, and therefore top bearing bracket 28 and the associated remainder of caster assembly 30 can be removably secured to bottom surface 16 of side rail 14 by the bolts 58 of the rivet nuts 54. This method of attaching caster assemblies 20 to side rails 14, results in a top surface 17 of side rails 14, without any protrusions, which is another novel aspect of the present invention.

Finally, in the preferred embodiment of the present invention, side rails 14 are not only tear shaped, but also have a vertical profile, as previously described, which is sufficiently wide so as to fully contact and cover the entire circumference of top race 32. Top race 32 therefore lies wholly within the vertical profile of side rails 14. As previously described, in the prior art, the bearing races are of larger diameter than the width of the side rails to which they attach which renders the caster assemblies susceptible to damage and creates weaknesses in the nuts securing the bolts used to secure the caster assemblies to the side rails. Also, this prior art design increases the wear and tear to the bearings because the weight placed on the prior art mechanic's creeper is not evenly distributed to the bearing race. The preferred embodiment of the present invention solves this problem by ensuring that top race 32 fully engages and is fully encompassed within the profile of side rails 14.

In light of the foregoing, it should thus be evident that a mechanic's creeper constructed as described herein substantially improves the art and otherwise accomplishes the objects of the present invention. While only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. A creeper comprising opposed side rails; a pad supported between said side rails; and a plurality of caster assemblies supporting said side rails; said side rails having planar top and bottom surfaces, said top surface tapering toward said bottom surface to define a decreased cross section of said side rails, the decreased cross section of said side rails being positioned adjacent said pad; said caster assemblies being positioned wholly under and attached solely to said bottom surface of said side rails.

2. A creeper according to claim 1 wherein said bottom surface of said side rails lies substantially parallel to the surface upon which the creeper is placed, and said top surface of said side rails is angled in relation to said bottom surface.

3. A creeper according to claim 2 wherein said side rails are substantially tear shaped such that no sharp or abrupt edges are provided by side rails.

4. A creeper according to claim 1 wherein each of said plurality of caster assemblies each include a top bearing bracket having a top race, each said top bearing bracket being attached directly to said bottom surface of said side rails such that each said top race of each said top bearing bracket lies wholly within the vertical profile of said side rail.

5. A creeper according to claim 4 wherein each of said plurality of caster assemblies further include a bottom bearing bracket having a bottom race; a wheel assembly connected to said caster assembly between said top and bottom bearing brackets; top rolling elements retained within said top race between said top bearing bracket and a portion of said wheel assembly; and bottom rolling elements retained within said bottom race between said bottom bearing bracket and a portion of said wheel assembly.

6. A creeper according to claim 5 wherein said wheel assembly includes a horn connected to said caster assembly between said top and bottom bearing brackets; an axle carried by said horn; and a wheel retained on said axle.

7. A creeper according to claim 6 wherein said horn forms top and bottom raceways to respectively receive said top and bottom rolling elements.

8. A creeper according to claim 1 wherein said plurality of caster assemblies are attached to said side rails without creating a protrusion on said top surface of said side rails.

9. A creeper according to claim 8 wherein said plurality of caster assemblies each include a top bearing bracket that is attached to said bottom surface of said side rails, said top bearing bracket providing a top race.

10. A creeper according to claim 9 wherein each of said plurality of caster assemblies further include a bottom bearing bracket having a bottom race; a wheel assembly connected to said caster assembly between said top and bottom bearing brackets; top rolling elements retained within said top race between said top bearing bracket and a portion of said wheel assembly; bottom rolling elements retained within said bottom race between said bottom bearing bracket and said wheel assembly; and a kingpin, said top and bottom bearing brackets and said wheel assembly being held in operative position by said kingpin.

11. A creeper according to claim 10 wherein said top bearing bracket is secured to said bottom surface of said side rails by rivet nuts.

12. A creeper according to claim 8 wherein each of said plurality of caster assemblies include a top bearing bracket having a top race, each said top bearing bracket being attached to one of said side rails such that each said top race of each said top bearing bracket lies wholly within the vertical profile of said side rail.

13. A creeper comprising hollow opposed side rails, each having a top surface spaced from a bottom surface by opposed arcuate surfaces to define a cavity therebetween; a pad supported between said side rails; and a plurality of caster assemblies each including a top bearing bracket having a top race, said top bearing bracket being attached to said bottom surface by a fastener extending through said bottom surface into said cavity such that no protrusion extends through said top surface, wherein said top race of said top bearing bracket lies wholly within the vertical profile of said side rail.

14. A creeper according to claim 13 wherein each of said plurality of caster assemblies further include a bottom bearing bracket having a bottom race; a wheel assembly connected to said caster assembly between said top and bottom bearing brackets; top rolling elements retained within said top race between said top bearing bracket and a portion of said wheel assembly; bottom rolling elements retained within said bottom race between said bottom bearing bracket and a portion of said wheel assembly.

15. A creeper according to claim 14 wherein said wheel assembly includes a horn connected to said caster assembly between said top and bottom bearing brackets; an axle carried by said horn; and a wheel retained on said axle.

16. A creeper according to claim 15 wherein said horn forms top and bottom raceways to respectively receive said top and bottom rolling elements.

17. A creeper according to claim 13 wherein each said plurality of caster assemblies further include a bottom bearing bracket having a bottom race; a wheel assembly connected to said caster assembly between said top and bottom bearing brackets; top rolling elements retained within said top race between said top bearing bracket and a portion of said wheel assembly; bottom rolling elements retained within said bottom race between said bottom bearing bracket and said wheel assembly; and a kingpin, said top and bottom bearing brackets and said wheel assembly being held in operative position by said kingpin.

18. A creeper according to claim 17 wherein said fastener is a rivet nut.

19. A creeper comprising opposed hollow side rails, each having a top surface spaced from a generally horizontal bottom surface by opposed arcuate surfaces to define a cavity therebetween; a pad supported between said side rails; and a plurality of caster assemblies supporting said side rails and attached thereto with a fastener extending through said bottom surface into said cavity without creating a protrusion on said top surface of said side rails.

20. A creeper according to claim 19 wherein said caster assemblies each include a top bearing bracket having a top race, and a bottom bearing bracket having a bottom race; a wheel assembly connected to said caster assembly between said top and bottom bearing brackets; top rolling elements retained within said top race between said top bearing bracket and a portion of said wheel assembly; and bottom rolling elements retained within said bottom race between said bottom bearing bracket and a portion of said wheel assembly.

21. A creeper according to claim 20 wherein each of said caster assemblies further include a kingpin, said bottom bearing bracket and said wheel assembly being held in operative position by said kingpin.

22. A creeper according to claim 21 wherein said fastener is a rivet nut.

23. A creeper comprising opposed side rails of a tapered cross section, each having a top and bottom surface; and a plurality of caster assemblies attached to and supporting said side rails, said caster assemblies each including a top bearing bracket attached to only the bottom surface of said side rails and providing a top race that lies wholly within the vertical profile of said side rail, each said caster assembly also including a kingpin holding said caster assembly in operative relation, wherein said kingpin does not extend through said top surface of said side rail.

* * * * *